(12) United States Patent
Chai

(10) Patent No.: US 11,279,641 B2
(45) Date of Patent: Mar. 22, 2022

(54) IOT-BASED SEWAGE TREATMENT SYSTEM

(71) Applicant: GER North America, LLC, Port Jervis, NY (US)

(72) Inventor: Wenguang Chai, Guangzhou (CN)

(73) Assignee: GER North America, LLC, Port Jervis, NY (US)

( * ) Notice: Subject to any disclaimer, the term of this patent is extended or adjusted under 35 U.S.C. 154(b) by 191 days.

(21) Appl. No.: 16/619,997

(22) PCT Filed: Sep. 27, 2018

(86) PCT No.: PCT/US2018/053112
§ 371 (c)(1),
(2) Date: Dec. 6, 2019

(87) PCT Pub. No.: WO2019/212590
PCT Pub. Date: Nov. 7, 2019

(65) Prior Publication Data
US 2020/0407253 A1 Dec. 31, 2020

Related U.S. Application Data

(60) Provisional application No. 62/666,917, filed on May 4, 2018.

(51) Int. Cl.
*C02F 3/10* (2006.01)
*C02F 3/00* (2006.01)

(52) U.S. Cl.
CPC .............. *C02F 3/109* (2013.01); *C02F 3/006* (2013.01); *C02F 2209/008* (2013.01); *C02F 2209/08* (2013.01)

(58) Field of Classification Search
CPC ... B01J 19/30; C02F 3/10; C02F 3/109; C02F 3/006; C02F 2209/008; C02F 2209/08
(Continued)

(56) References Cited

U.S. PATENT DOCUMENTS

| 2,212,932 | A | * | 8/1940 | Fairlie | ..................... | B01J 19/30 |
| | | | | | | 261/94 |
| 4,668,442 | A | * | 5/1987 | Lang | ....................... | B01J 19/30 |
| | | | | | | 261/94 |
| 4,842,920 | A | * | 6/1989 | Banai | ..................... | B01J 19/30 |
| | | | | | | 428/184 |

FOREIGN PATENT DOCUMENTS

| CN | 107216994 A | 9/2017 |
| CN | 107226589 A | 10/2017 |
| CN | 107244730 A | 10/2017 |

OTHER PUBLICATIONS

International Search Report from PCT/US2018/053112, dated Nov. 1, 2018.

* cited by examiner

*Primary Examiner* — Claire A Norris
(74) *Attorney, Agent, or Firm* — Lerner, David, Littenberg, Krumholz & Mentlik, LLP

(57) ABSTRACT

The present invention discloses a filler component based on the Internet of Things (IoT). The filler component includes a main board, a first piece, a second piece, an accessory piece, a plurality of first through holes, and a plurality of second through holes. The main board includes a first curved surface and a second curved surface arranged opposite to each other and that are configured to form a double elliptical cross structure having a cavity. The first piece, the second piece, and the accessory piece are respectively fixed in the cavity of the main board. The first and second pieces are perpendicular to each other, and the accessory piece is parallel to the second piece and perpendicular to the first piece. The plurality of first through holes is arranged on the main board; the plurality of second through holes is arranged on the first piece and/or second piece.

8 Claims, 11 Drawing Sheets

(58) Field of Classification Search
USPC .................................................. 210/615, 85
See application file for complete search history.

100D

300

500

IOT-BASED SEWAGE TREATMENT SYSTEM

CROSS-REFERENCE TO RELATED APPLICATION

The present application is a national phase entry under 35 U.S.C. § 371 of International Application No. PCT/US2018/053112 filed Sep. 27, 2018, published in English, which claims the benefit of the filing date of U.S. Provisional Application No. 62/666,917, filed May 4, 2018, all of which are incorporated herein by reference.

BACKGROUND OF THE INVENTION

As modernization increases in cities, the associated problems of domestic sewage have been exacerbated, posing a serious threat to our lives and health, due to increased domestic sewage pollution and increased total sewage emissions. In order to avoid secondary pollution caused by sewage, it is important to improve the level and capacity of sewage treatment.

Sludge microorganisms may be cultivated in devices for anoxic, anaerobic, and aerobic reactions to remove organic matters, nitrogen, and phosphorus in wastewater, thereby achieving the purpose of sewage treatment. However, there are some shortcomings in the traditional way of pollutant treatment in this field, such as a large amount of residual sludge, high energy consumption, complex device system, and inability to monitor bioactivity online in real time. In addition, current anaerobic fermentation devices for treatment of pollutants in this field have problems including high energy consumption for stirring in anaerobic reaction and frequent congestion during methane collection.

Furthermore, current bioactive filler components used for sewage treatment may be granular meteorite, coking coal, cinder, reticular plastic corrugated boards, or plastics without containing bioaffinity additives, which generally may have certain defects. Filler components with no internal turbulent structure may, as a result, have low water flow contact rates. Filler components with no bioaffinity may, as a result, have poor biomembrane formation effects, and may be less effective in having microbial species attached on the components. In either circumstance, the biological treatment effect may be negatively affected. Moreover, filler components may not have online monitoring unit arranged for monitoring the working state of the filler itself.

BRIEF SUMMARY OF THE INVENTION

The present invention relates to the field of environmental protection technology, in particular to a bioactive filler component that is based on the Internet of Things (IoT). The technical problem to be solved is to provide a bioactive filler component that has a simple structure that allows a water flow to be formed into an internal colliding turbulent space in a filler component and delivers a powerful function of treating water pollutants and removing a wide range of pollutants. The bioactive filler component may have an internal turbulent structure, bioaffinity additives, and an online monitoring unit.

The bioactive filler component may be an IoT-based bioactive filler component. Namely, the bioactive filler component may include a main board, a first piece, a second piece, an accessory piece, a plurality of first through holes, and a plurality of second through holes. The main board may include a first curved surface and a second curved surface arranged opposite to each other, and the outer contours of the first curved surface and the second curved surface may be elliptical. Both ends of the first curved surface and those of the second curved surface may be assembled to form a double elliptical cross structure having a hollow cavity. In addition, the first piece, the second piece, and the accessory piece may be respectively fixed in the hollow cavity of the main board. In some examples, the first piece and the second piece may be perpendicular to each other, and the accessory piece may be perpendicular to the first piece and parallel to the second piece. The plurality of first through holes may be arranged on the main board, and the plurality of second through holes may be arranged on the first piece and/or second piece.

In some implementations, the first curved surface and the second curved surface may be symmetrically arranged with the second piece as a plane of symmetry. In addition, the first piece may be connected with the first curved surface and may divide the first curved surface into a first left curved surface and a first right curved surface symmetrically arranged. The first piece may also be connected with the second curved surface and may divide the second curved surface into a second left curved surface and a second right curved surface symmetrically arranged.

In other implementations, the first piece and the second piece may have a rectangular structure. Additionally, the four corners of the first piece and the four corners of the second piece may be arc chamfers.

In a further implementation, the main board, the first piece, the second piece, and the accessory piece may be arranged to form at least approximately a spherical structure.

In yet other implementations, the main board, the first piece, the second piece, and the accessory piece may be composed of bioactive materials having affinity to microorganisms or otherwise configured to attract microorganisms. In particular, the bioactive materials may be plastics in which an additive with bioaffinity is added.

In some implementations, the bioactive filler component may also include a sensor module that is configured to wirelessly transmit data. Additionally, the sensor module may be fixed on the first through holes.

In further implementations, the sensor module may include a signal conditioning circuit, a microcontroller, a radio transceiver, and/or an internal power supply that are electrically connected to one another.

In other implementations, the sensor module may be any one or more types of a microbial sensor. For example, the sensor module may be a dissolved oxygen sensor, a COD sensor, a TN sensor, an NH3 sensor, a TP sensor, a pH sensor, an SS sensor, a chroma sensor, a turbidity sensor, a temperature sensor, or a pressure sensor.

In still other implementations, the bioactive filler component may also include an external power supply arranged outside a sealed tank. The sensor module and the external power supply may be connected in a wired and/or wireless mode.

In further implementations, the sensor module may be connected to the IoT.

An IoT-based bioactive filler component as disclosed herein may be used for the biochemical process of domestic sewage treatment, and may allow for a powerful function of treating water pollutants, removal of a wide range of pollutants, and little residual sludge. In addition, it may provide the advantage of simple manufacture, which may result in a lower overall cost when built-in sensor modules are used at intervals. Specifically, the present invention has the following beneficial effects:

(1) In the present disclosure, the main board, the first piece, the second piece, and the accessory piece may be composed of bioactive materials having affinity to microorganisms, suitable for the generation of all kinds of biomembranes. The bioactive filler component may therefore provide improved biomembrane formation effects and may increase the microbial species that can be attached to the filler component.

(2) The main board of the bioactive filler component may have a double elliptical cross structure that may allow a water flow to be formed into an internal colliding turbulent space in a hollow cavity of the component. The component may therefore increase the water flow contact rate.

(3) In the present disclosure, the main board, the first piece, and the second piece may be designed with through holes that facilitate the flow of fluids. The bioactive filler component may therefore allow fluids to flow to every corner of the component and increase the water flow contact rate.

(4) In the present disclosure, the first piece and the second piece may be located in a three-dimensional space (hollow cavity) of the bioactive filter component. Therefore, the surface area of the bioactive filter component may increase, and a generated biomembrane may form a three-dimensional reticular biomembrane. Thus, the biomembranes may be connected to one another and form a biological chain system, which as a result is not likely to fall off.

(5) In the present disclosure, a sensor module may be used to monitor the bioactive filler component in real time. For example, the sensor module may detect and monitor the microbial biomass, dissolved oxygen amount, and other key parameters that reflect biological activity. The bioactive filler component may therefore provide accurate working parameters for a biological oxygen supply system.

DETAILED DESCRIPTION

Example Bioactive Filler Component

The bioactive filler will be further described in detail with the accompanying drawings. The locative words such as "upper", "lower", "left", "right", "front", "back", "inside", and "outside", which appeared or will appear in this document, are only based on the attached drawings, instead of specifically limiting the present invention.

A sewage treatment system may include an IoT-based bioactive filler component for the biochemical treatment of industrial and domestic sewage, industrial waste gases, odors, organic volatile gases, and industrial and domestic organic solid wastes. When domestic sewage enters the sewage treatment system, the sewage may first pass through a coarse sieve and a sand removing pool, which may remove solid waste. Then, the sewage may flow into a conditioning pool, which may condition the remaining water to be suitable for living organisms. After the water is conditioned to be suitable for living organisms, the water may enter a biochemical pool including a plurality of bioactive fillers. Parameters for adjusting the oxygen supply in real time may be obtained by a sensor on one or more of the plurality of bioactive fillers. After sewage treatment, the treatment effect is tested and found to meet the requirements of the corresponding sewage treatment standard.

Figure 1A:
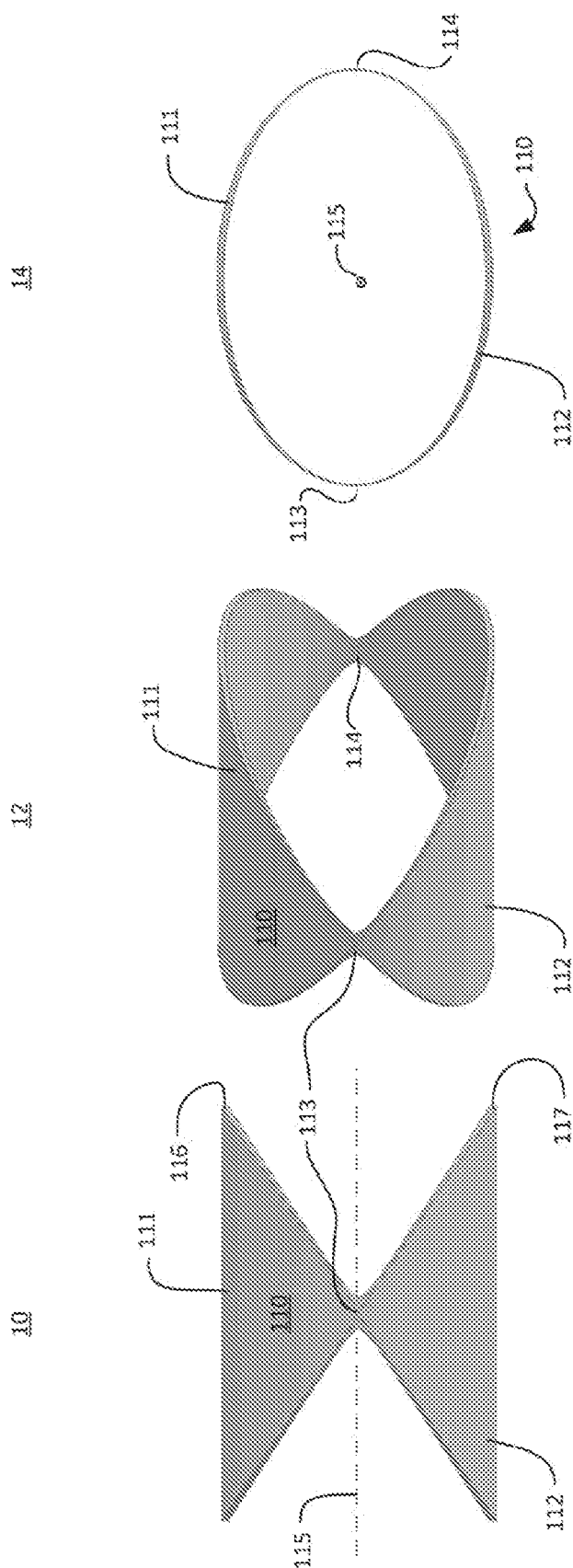
FIGS. 1A-1E are views of an IoT-based bioactive filler component in accordance with aspects of the disclosure.
Figure 1B:
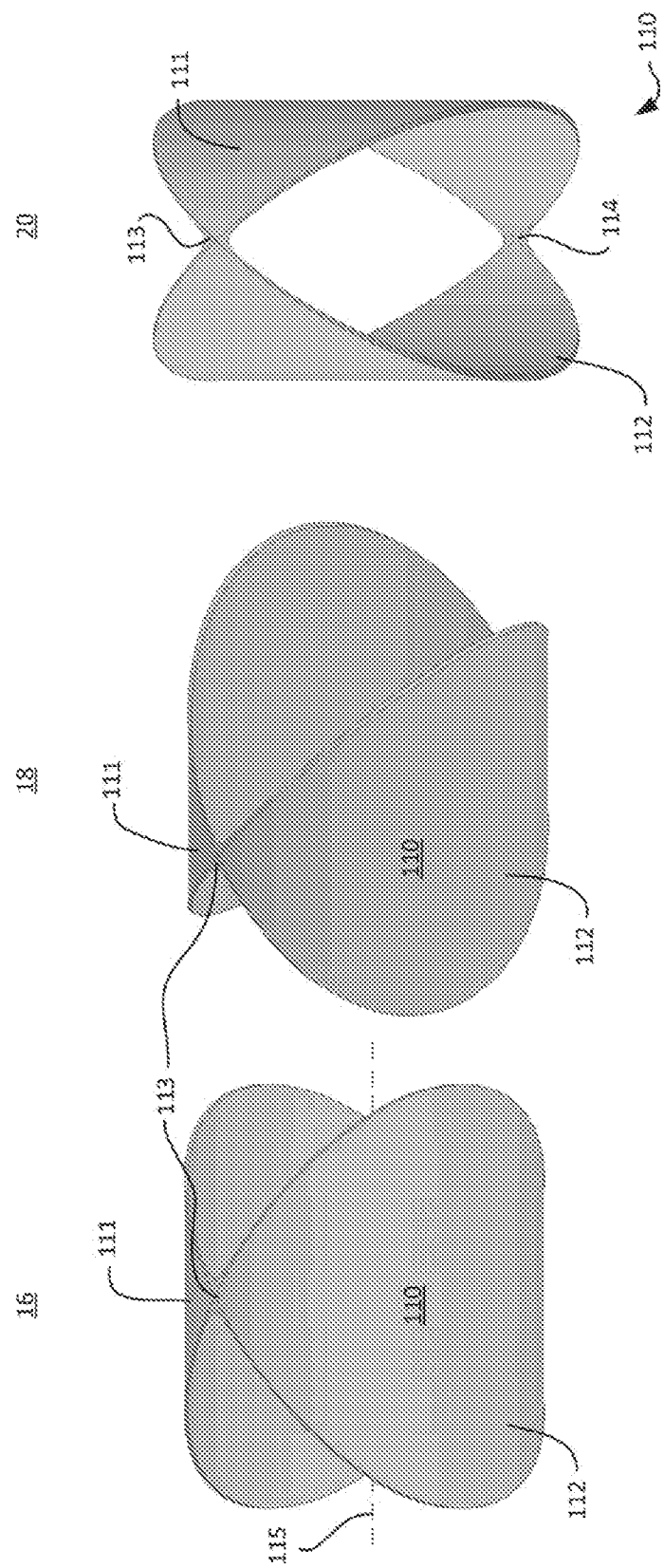
Figure 1C:
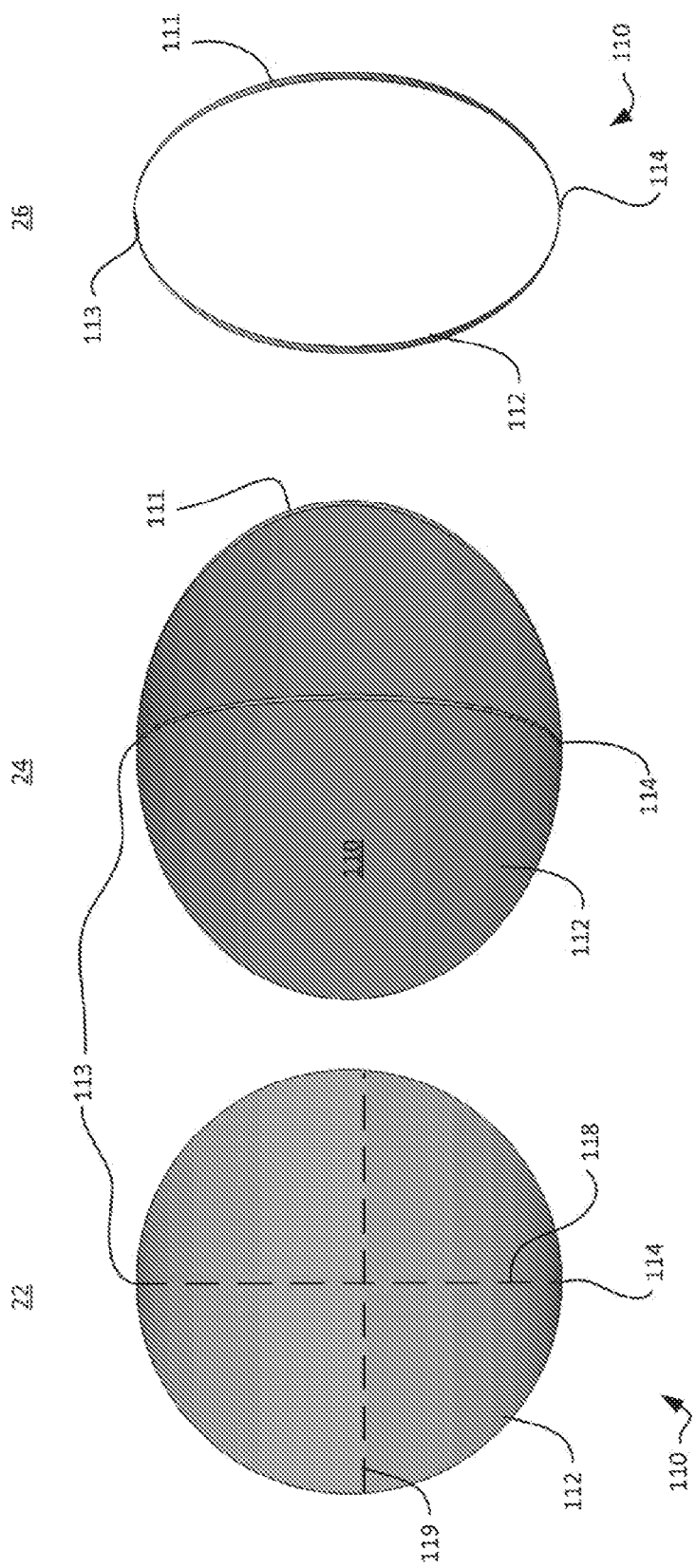
Figure 1D:
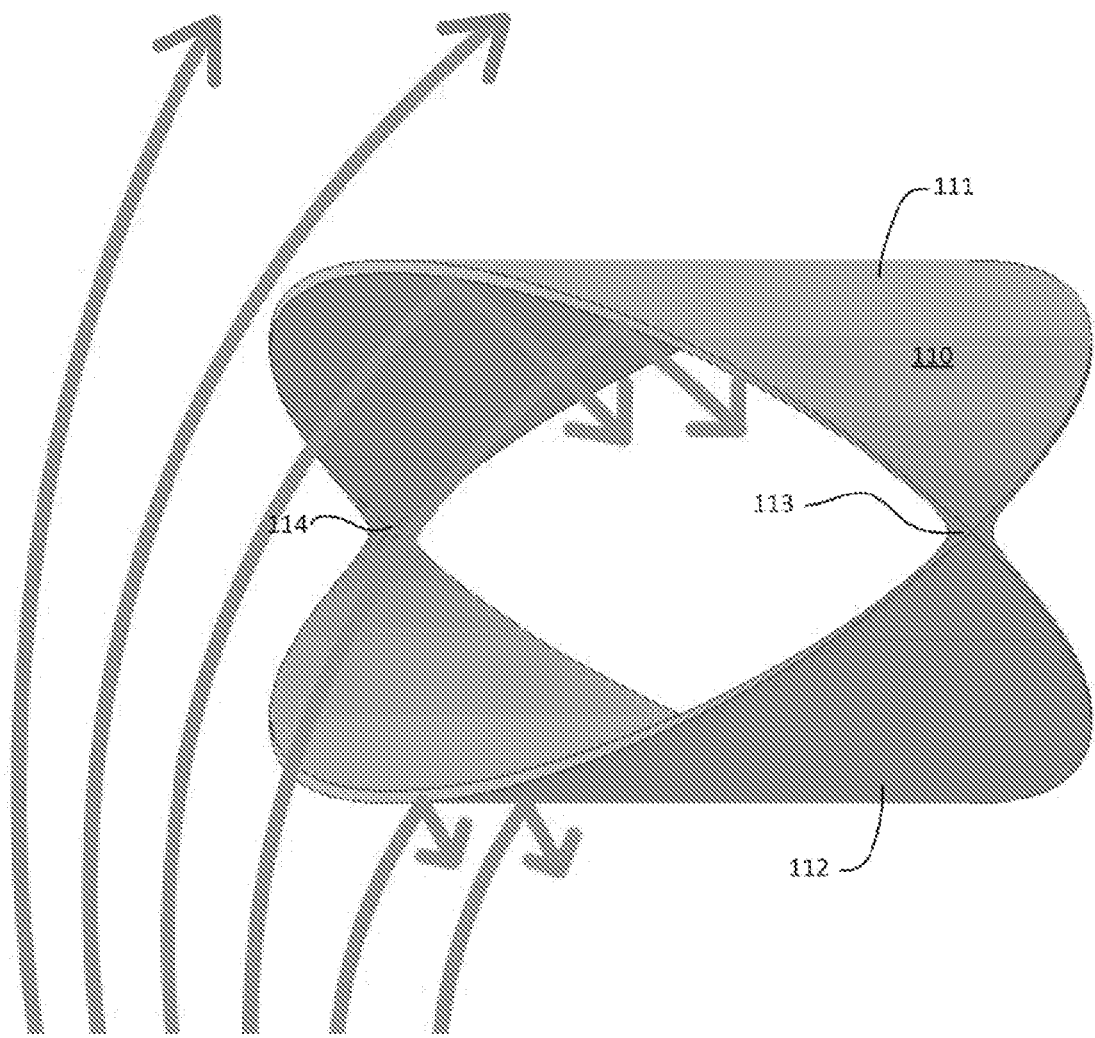
Figure 1E:
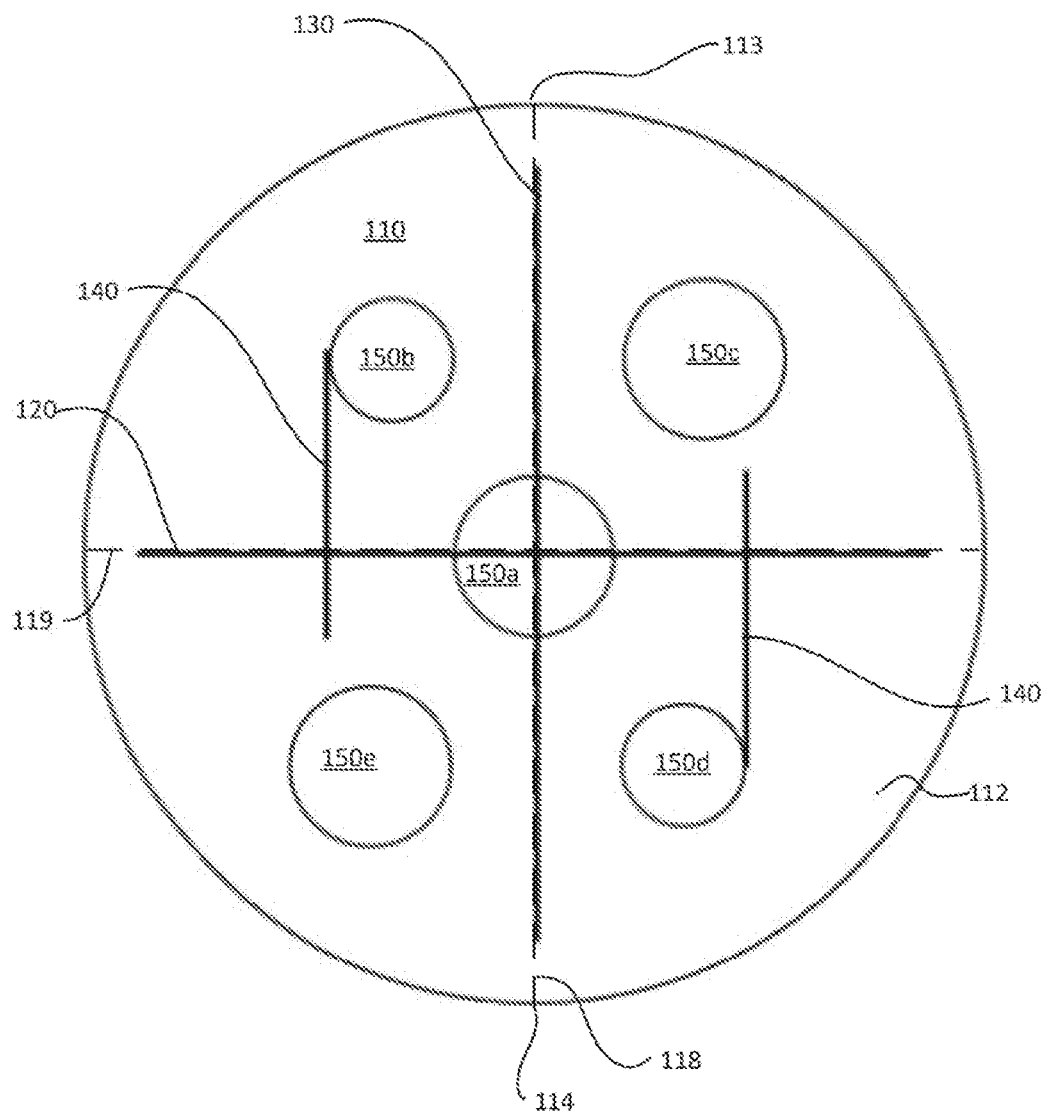
Figure 2:
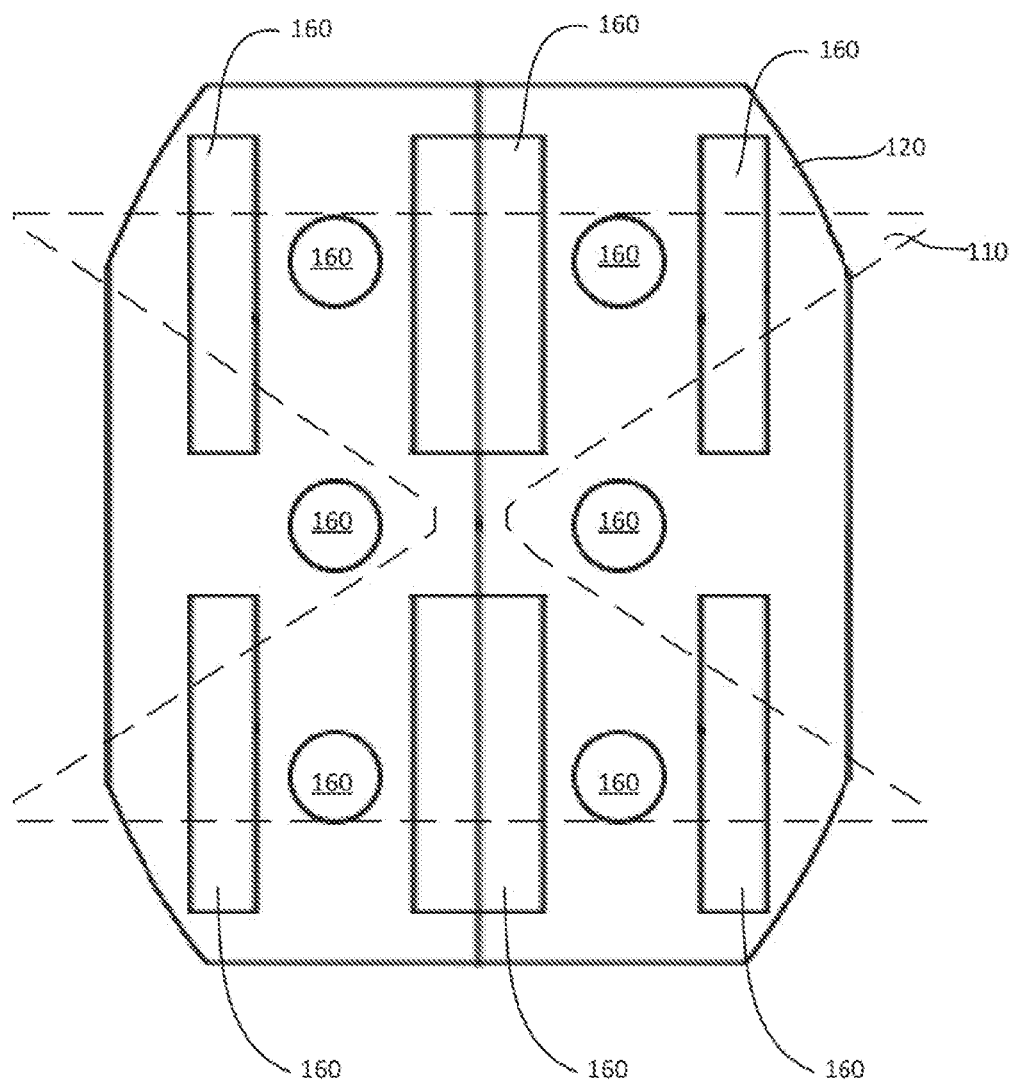
FIG. 2 is a front view 200 of the IoT-based bioactive filler component in accordance with aspects of the disclosure.
Figure 3:
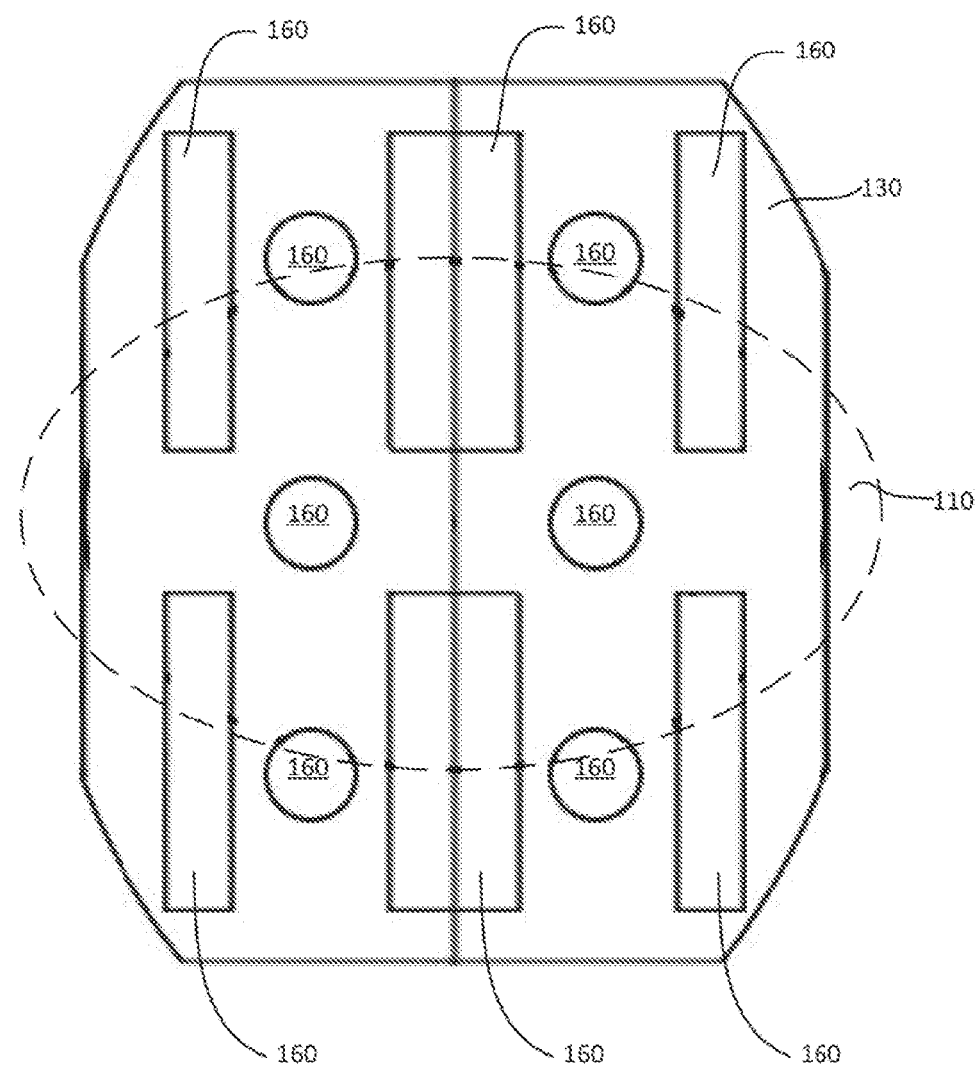
FIG. 3 is a lateral view 300 of the IoT-based bioactive filler component in accordance with aspects of the disclosure.

FIGS. 1 to 3 show the specific structure of an IoT-based bioactive filler component according to the disclosure. As shown in the Figures and described in more detail below, the bioactive filler component includes a main board 110, a first piece 120, a second piece 130, one or more accessory pieces 140, a plurality of first through holes 150, and a plurality of second through holes 160. In addition, the plurality of first through holes 150 may be arranged on the main board 110, and the plurality of second through holes 160 may be arranged on the first piece 120 and/or second piece 130.

As shown in FIGS. 1A-1C, the main board 110 may be a hollow cylinder formed of a first curved surface 111 and a second curved surface 112. The first curved surface 111 and the second curved surface 112 may be arranged opposite to each other and connected at a first end 113 and a second end 114 to form the cylinder about a pass through axis 115. For example, the first curved surface 111 may be at least approximately a circle having a first axis that extends across a diameter of the first curved surface 111 and a second axis that is perpendicular to the first axis. The second curved surface 112 may be the same shape as the first curved surface 111. An edge point of the first curved surface 111 that is on the first axis of the first curved surface may be connected to an edge point of the second curved surface 112 that is on the first axis of the second curved surface to form the first end 113. Another edge point of the first curved surface 111 that is on the first axis of the first curved surface may be connected to another edge point of the second curved surface 112 that is on the first axis of the second curved surface to form the second end 114. The cylindrical opening formed by the first curved surface 111 and the second curved surface 112 may be an ellipse or an oval. For example, the distance between the first end 113 and the second end 114 may be larger than the distance between the second axis of the first curved surface 111 and the second axis of the second curved surface 112.

FIG. 1A shows a front elevational view 10, a perspective elevational view 12, and a side elevational view 14 of the main board 110. The front elevational view 10 shows the first curved surface 111 and the second curved surface 112 is joined at the first end 113. The second end 114 is positioned behind the first end 113 shown in the front elevational view 10. From the front elevational view 10, the main board 110 is shown having a first width at a first edge 116 and a second edge 117 opposite the first end. The first edge 116 is at or near the second axis of the first curved surface 111, and the second edge 1117 is at or near the second axis of the second curved surface 112. The first end 113 is equidistant from the first edge 116 and the second edge 117 and has a second width that is smaller than the first width. The shape of the front elevational view 10 of the main board may be a bow tie shape, starting from the first edge 116 tapering to the first edge 116 and widening to the second edge 117, such that the main board is symmetrical about the first edge 116. In addition, the thickness of the first curved surface 111 may be greater at the first edge 116 and smaller at the first end 113 and the second end 114, and the thickness of the second curved surface 112 may be greater at the second edge 117 and smaller at the first end 113 and the second end 114.

In the perspective elevational view 12, the main board 110 is rotated about 45 degrees from the front elevational view 10 about a yaw axis passing through the centers of the first curved surface 111 and the second curved surface 112. The outer side of the first end 113 is shown in the perspective elevational view 12, as well as the inner side of the second end 114. A portion of the cylindrical opening is also shown.

In the side elevational view 14, the main board 110 is rotated about 90 degrees from the front elevational view 10 about the yaw axis passing through the centers of the first curved surface 111 and the second curved surface 112. The side edge of the first curved surface 111 and the second curved surface 112 is shown in the side elevational view 14, as well as the cylindrical opening. As shown in the side elevational view 14, the cylindrical opening is elliptical or oval and is centered about axis 115.

FIG. 1B shows an angled front view 16, an angled perspective view 18, and an angled side view 20. In the angled front view 16, the main board 110 is rotated about 45 degrees from the front elevational view 10 about the axis 115. The first end 113 is rotated in the direction of the first edge 116, showing more of the outer side of the second curved surface 112, less of the outer side of the first curved surface 111, and more of the inner side of the first curved surface 111. In the angled perspective view 18, the main board 110 is rotated about 45 degrees from the angled front view 16 by rotating the axis 115 about 45 degrees clockwise from the plane of the page. In addition, in the angled side view 20, the main board 110 is rotated about 90 degrees from the angled front view 16 by rotating the axis 115 about 90 degrees clockwise from the plane of the page. In this view, the outer side of the first end 113 is shown and the inner side of the second end 114 is shown. A portion of the cylindrical opening of the main board 110 is also visible in this view.

FIG. 1C shows a plan view 22, a perspective plan view 24, and a side view 26. In the plan view 22, the main board 110 is rotated about 90 degrees from the front elevation view about the axis 115. The first end 113 is rotated in the direction of the first edge 116, such that the first curved surface 111 is completely obscured by the second curved surface 112 in this view. From the plan view 22, the circular shape of the second curved surface 112 is visible. The first end 113 and the second end 114 are shown positioned on opposite ends of the first axis 118 of the second curved surface 112, equidistant from the second axis 119 of the second curved surface that is perpendicular to the first axis 118. In the perspective plan view 24, the main board 110 is rotated about 45 degrees from the plan view 22 about a major axis between the first end 113 and the second end 114. In the perspective plan view 24, the second curved surface 112 is rotated clockwise about the major axis and is positioned at an angle that shows a portion of the inner side of the first curved surface 111. In the side view 26, the main board is rotated about 90 degrees from the plan view 22 about the major axis. The side edge of the first curved surface 111 and the second curved surface 112 is shown in the side elevational view 14, as well as the cylindrical opening. As shown in the side elevational view 14, the cylindrical opening is elliptical or oval and is centered about axis 115.

As shown in FIG. 1D, the main board 110 may allow for a water flow into and out of the hollow cylinder formed between the first and second curved surfaces 111, 112. Namely, water, illustrated as arrows in FIG. 1D, may flow into and out of the hollow cylinder via the space between the first and second curved surfaces 111, 112. By allowing water to flow through the hollow cavity, water flow contact rates may be increased. In addition, the main board 110 may include a plurality of first and second through holes (150, 160), shown in FIG. 1E, that may also facilitate the flow of fluids, allowing fluids to flow to every portion of the main board 110, the first piece 120, and the second piece 130. As the water flows through and around the bioactive filler component, the pollutants and oxygen in the water may be caused to come into contact with the surfaces of the bioactive filler component, and a biomembrane may be formed on the surface of the bioactive filler component, as described in more detail below. The generated biomembrane may be a three-dimensional reticular biomembrane that may be capable of connecting to another biomembrane, not prone to fall off, and may form a biological chain system.

FIG. 1E shows a plan view of the bioactive filler component, similar in perspective to plan view 22 of the main board 110. In some implementations, the main board 110 includes a plurality of first through holes 150 that passes through the first curved surface 111, the second curved surfaces 112, or both. The plurality of first through holes 150 may be positioned, for example, at a center of the first or second curved surface 111, 112 and/or at each quadrant of the first or second curved surface 111, 112. The four quadrants of the first or second curved surface may be delineated by the first and second axes of the first or second curved surface, such as the first axis 118 and the second axis 119 of the second curved surface 112. As shown in FIG. 1E, a through hole 150a at the center of the second curved surface 112 may have a first radius, a through hole 150b at a first quadrant may have a second radius smaller than the first radius, a through hole 150c at a second quadrant adjacent to the first quadrant may have the first radius, a through hole 150d at a third quadrant adjacent to the second quadrant and diagonal to the first quadrant may have the second radius, and a through hole 150e at a fourth quadrant adjacent to the first and third quadrants and diagonal to the second quadrant may have the first radius. Through holes 150c, 150a, and 150e may be positioned on a first straight line, and through holes 150b, 150a, and 150d may be positioned on a second straight line intersecting the first straight line.

As further shown in FIG. 1E, the first piece 120, the second piece 130, and the one or more accessory pieces 140 may be respectively assembled with the main board 110. The first piece 120 and the second piece 130 may be perpendicular to each other, positioned along the second axis 119 and the first axis 118, respectively. In addition, the one or more accessory pieces 140 may be parallel to the second piece 130 and perpendicular to the first piece 120.

FIG. 2 shows a front elevational view of the bioactive filler component, similar in perspective as front elevational view 10 of the main board 110. The outline for the main board 110 is shown in FIG. 2 in dashed lines, and is otherwise removed from view to show the first piece 120 in more detail. As shown in FIG. 2, the first piece 120 may be a flat or substantially flat piece of material. The shape of the first piece 120 may be a rectangle or may have curved or cut off corners, such as arc chamfers. The plurality of second through holes 160 may pass through the first piece 120. In some implementations, the plurality of second through holes 160 may include circle-shaped through holes and/or rectangle-shaped through holes. In some implementations, the first piece 120 may be assembled with the main board 110, as shown in FIG. 2, such that the edge of the main board 110 goes diagonally across the first piece 120.

FIG. 3 shows a side elevation view of the bioactive filler component, similar in perspective as side elevational view 14 of the main board 110. The outline for the main board 110 is shown in FIG. 3 in dashed lines, and is otherwise removed from view to show the second piece 130 in more detail. As shown in FIG. 3, the second piece 130 may be same or similar size and shape to the first piece 120. For example, the second piece 130 may also be a flat or substantially flat piece of material. The shape of the second piece 130 may be a rectangle or may have curved or cut off corners, such as arc chamfers. The plurality of second through holes 160 may also include through holes that pass through the second piece 130. In some implementations, the plurality of second through holes 160 may include circle-shaped through holes and/or rectangle-shaped through holes. The second piece 130 may be assembled perpendicular with the first piece 120, as shown in FIG. 1, and an axis of joinder between the first and second pieces 120 and 130 may pass through the center of the main board 110. In some implementations, the second piece 130 may also be assembled with the main board 110, such that the edge of the main board 110 goes diagonally across the second piece 130.

Further shown in FIG. 1E, the one or more accessory pieces 140 may also be flat or substantially flat pieces of material. In some implementations, the one or more accessory pieces 140 are smaller in size than the first and second pieces 120 and 130. The one or more accessory pieces may be assembled perpendicular with the first piece 120 and parallel to the second piece 130, as shown in FIG. 1. In some cases, the one or more accessory pieces may connect an edge of the first piece 120 with the first curved surface 111 of the main board 110. The example shown in the Figures has two accessory pieces 140, but other examples may use more or less.

Regarding formation of the biomembrane, the main board 110, the first piece 120, the second piece 130, and the one or more accessory pieces 140 may be composed of bioactive materials having affinity to microorganisms. In some implementations, the outer structure 170 may also be composed of such bioactive materials. The type of bioactive material is not limited as long as it has affinity to the microorganisms used in the waste treatment. It may be chosen depending on the need of the waste treatment. For example, the bioactive materials may be plastics in which an additive with bioaffinity is added. Use of such bioactive materials may increase the density of microorganisms that is collected on the surface of the bioactive filler component, which may allow for a more powerful pollutant treatment capacity of the bioactive filler component.

The plastic used may be a hard plastic or a semi-rigid plastic. Preferably, the plastic used is a hard plastic. The hard plastic may be composed of the materials including, but not limited to, acrylonitrile butadiene styrene (ABS), polyoxymethylene (POM), polyurethane (PU), polystyrene (PS), polymethyl methacrylate (PMMA), polycarbonate (PC), polyethylene terephthalate (PET), polybutylene terephthalate (PBT), poly(phenylene oxide) (PPO), and combinations thereof. The semi-rigid plastic may be composed of the materials including, but not limited to, polypropylene (PP), polyethylene (PE), polyamide (PA), polyvinyl chloride (PVC), and combinations thereof. The bioaffinity additive may be a polymer or copolymer. It includes, but not limited to, polypyrrole (Ppy), perfluorocarbon polymer, a synthetic copolymer of poly N-isopropyl acrylamide and methacrylic acid (P-ONIPAAm-co-MAA), and combinations thereof. The amounts of the plastic and additive may be adjusted to have a bioaffinity to attract the most amounts of microorganisms from the waste. In one embodiment, the amount of the plastic is about 90 wt % to about 99.7 wt % of the total amount of the bioactive filler material, and the amount of the additive is about 0.3 wt % to about 10 wt % of the total amount of the bioactive filler material, respectively. Preferably, the amount of the plastic is about 97 wt % to about 99.7 wt % of the total amount of the bioactive filler material, and the amount of the additive is about 0.3 wt % to about 3 wt % of the total amount of the bioactive filler material, respectively.

In one embodiment, the bioactive filler material may be comprised of (1) Polyurethane (PU) as the plastic; and (2) Synthetic polymer P-ONIPAAm-co-MAA as the additive having bioaffinity. Polyurethane (PU) is a widely used synthetic polymer material obtained by co-reaction of an organic isocyanate compound with a variety of reactive hydrogen compounds such as alcohols and amines.

Synthetic polymer P-ONIPAAm-co-MAA may be synthesized as follows: Using mercaptopropionic acid as a chain transfer agent and the radical polymerization method, oligo(poly N-isopropyl acrylamide) (ONIPAAm) with an active carboxyl group may be obtained by aqueous synthesis. The carboxyl group at the end of the ONIPAAm may be activated by a bifunctional reagent—carbodiimide (EDCI) and then may be coupled with biological molecules, such as antibodies, oligonucleotides, or micromolecular organic mimic enzymes to obtain a functional polymer. The oligo (poly N-isopropyl acrylamide) may react with methacrylic acid (MAA) by free radical polymerization to synthesize bioaffinity polymer P-ONIPAAm-co-MAA, namely, bioaffinity polymer P (ONIPAAm-co-MAA). The surface of the synthesized bioaffinity polymer P (ONIPAAm-co-MAA) material may have positive charges. At the final stage of treatment, the pH value of treated wastewater is usually greater than 7, which is higher than the isoelectric points of the microorganisms used in the wastewater treatment. Therefore, the microorganisms used therein generally have negative charges. In this way, the surface of the synthesized P (ONIPAAm-co-MAA) material may attract cells of such microorganisms, and the bioactive filler component made of a plastic having such additive may be capable of absorbing an increased amount of microbial populations. In addition, the molecular structure of the P (ONIPAAm-co-MAA) material may be similar to that of a cell, which is beneficial to the affinity growth of a microbial membrane on its surface. Use of such bioactive materials increases the density of microorganisms that is collected on the surface of bioactive filler component, which increases pollutant treatment capacity of the bioactive filler component.

When created using the above described materials, the surfaces of a bioactive filler component may be positively charged. The amounts of PU and P-ONIPAAm-co-MAA may be adjusted to obtain a bioactive filler component with surfaces having a proper charge. In one embodiment, the amount of PU is about 90 wt % to about 99.7 wt % of the total amount of the bioactive filler material, and the amount of P-ONIPAAm-co-MAA is about 0.3 wt % to about 10 wt % of the total amount of the bioactive filler material. Preferably, the amount of PU is about 97 wt % to about 99.7 wt % of the total amount of the bioactive filler material, and the amount of P-ONIPAAm-co-MAA is about 0.3 wt % to about 3 wt % of the total amount of the bioactive filler material. The bioactive material having PU and P-ONIPAAm-co-MAA in such amounts may have a bioaffinity to attract the most amounts of microorganisms from the waste. If the amount of P-ONIPAAm-co-MAA is less than 0.3 wt % of the total amount of the bioactive filler material, the surface of the bioactive filler component is not sufficiently positively charged, and therefore the bioaffinity is too weak to attract microorganisms from the wastewater. On the other hand, if the amount of P-ONIPAAm-co-MAA is more than 10 wt % of the total amount of the bioactive filler material, the surface of the bioactive filler component is overly positively charged to cause bacteriolysis, and contact death of the microorganisms. In one embodiment, the bioactive filler is composed of 99.62 wt % of PU and 0.38 wt % of P-ONIPAAm-co-MAA.

An IoT-based bioactive filler component further may include a sensor module that supports a scalable wireless data transmission network. The sensor module may be attached with an adhesive to any portion of the bioactive filler component, preferably on one of the plurality of first through holes 150 of the main board 110, but not limited thereto. Preferably, the sensor module may include one or more types of a microbial sensor (for example, an electrode capacitance sensor), a dissolved oxygen sensor, a COD sensor, a TN sensor, an NH3 sensor, a TP sensor, a pH sensor, an SS sensor, a chroma sensor, a turbidity sensor, a temperature sensor, and/or a pressure sensor, but is not limited thereto.

Regarding how to incorporate a sensor into a device and technical principles of collecting, amplifying, processing, and transmitting signals/data, these techniques are currently well known, and a large number of mature product solutions are available on the market. Specifically, the sensor module may include a signal conditioning circuit, a microcontroller, a transceiver, and an internal power supply that are electrically connected to one another. When working, the sensor module may collect electrical signal data about the water and send the collected electrical signal data to the signal conditioning circuit for processing, such as interference removal, noise reduction, and amplification. Then, the microcontroller may convert or transform the processed electrical signal data into monitoring data, such as information about water flow or water content, and send the monitoring data to an external gateway by the transceiver. Using the transceiver, the sensor module may be connected to the IoT. The transceiver may transmit the monitoring data processed by the microcontroller to an external gateway by a certain protocol (for example, IEEE 802.11s, also known as the mesh network technology) and wireless communication technology (for example, a bidirectional wireless communication technology).

It should be noted that the sensor module may be powered either by an internal power supply or by an external power supply (power from the outside). In order to allow the sensor module to be powered by an external power supply, an external power supply may be arranged remotely from the bioactive filler component, such as outside a sealed tank containing one or more bioactive filler components. The sensor module and the external power supply may be connected in a wired and/or wireless mode. When the sensor module and an external power supply are connected in a wireless mode, the external power supply may be a wireless power supply device, and the sensor module may be configured to receive electromagnetic waves from the wireless power supply device across a certain distance and then convert the electromagnetic waves into electric power.

The bioactive fillers may be installed in the sewage treatment system as follows: In a sewage treatment pool or sewage treatment tank, starting from the bottom of the pool or the bottom of the tank, bioactive filler components may be stacked one by one until a designated height is reached, such as 2.5 meters, or more or less. The orientation of each stacked bioactive filler component may be arbitrary or random. Then, a metal frame or cover may be placed tightly on top of the stack of bioactive filler components to fix the stacked bioactive filler components, thus preventing the bioactive filler components from moving with the water flows or floating to the surface. In some examples, one bioactive filler component for each cubic meter of bioactive filler components may be equipped with a sensor module as described above.

Example Anaerobic Tank

Figure 4:
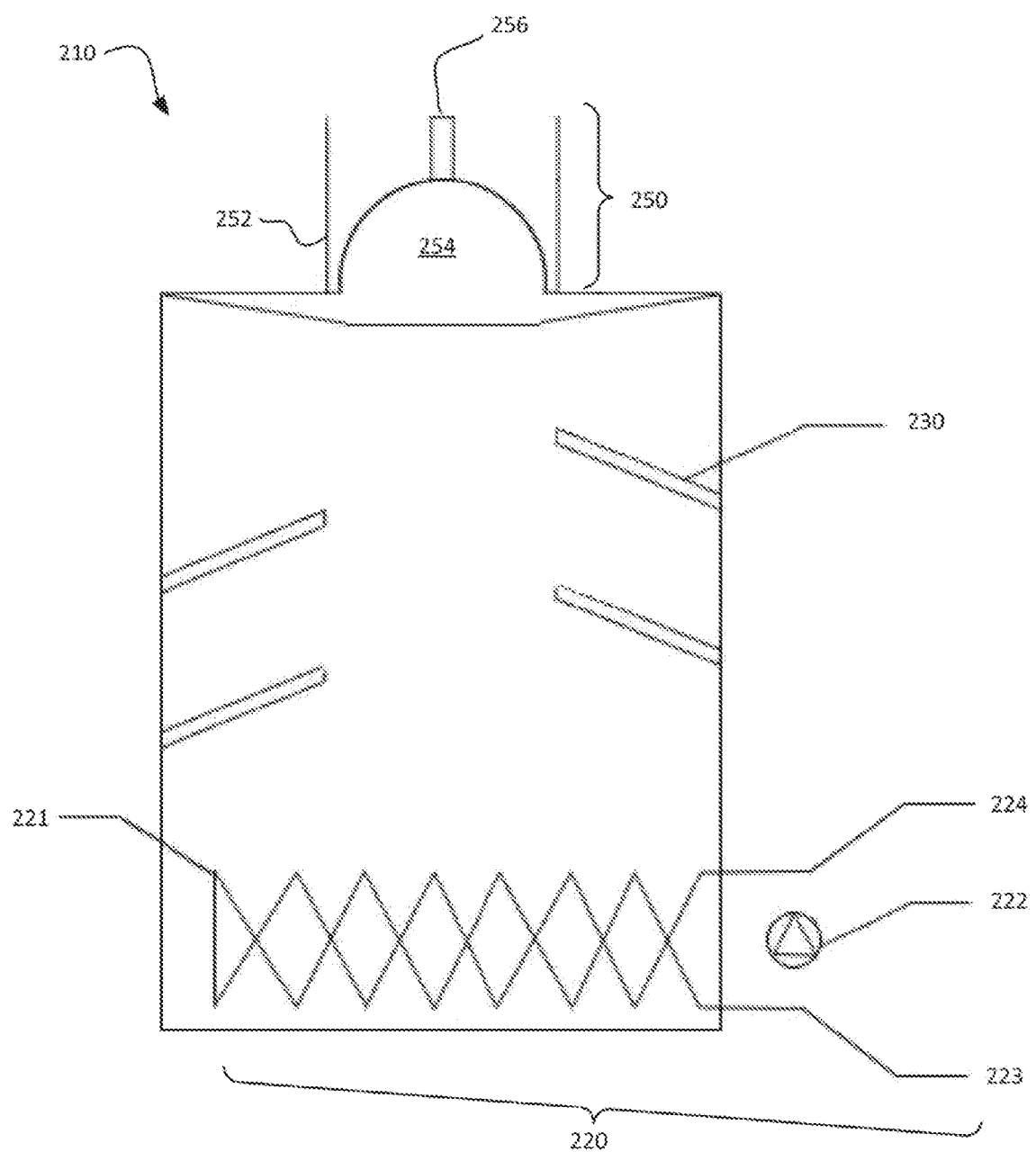
FIG. 4 is a structural diagram 400 of an IoT-based self-elevating stirring guide anaerobic fermentation device according to the present invention.

The sewage treatment system may also include an IoT-based anaerobic fermentation tank having a structure that may improve the sewage treatment capacity of an anaerobic pool, reduce energy consumption, and lower operating costs. As shown in FIG. 4, the anaerobic fermentation tank may include a sealed tank 210. The sealed tank may have a square base (same width and length) and a height (approximately double the width or length). For example, the width may be 1 meter, the length may be 1 meter, and the height may be 3 meters. In some implementations, the sealed tank may be made of concrete. The interior of the sealed tank 210 may be filled with a bioactive filler component, such as the bioactive filler component 110 described above. The bottom of the sealed tank 210 may be in contact with a heating device 220. The heating device 220 may be used for heating the sewage water in the sealed tank 210, so that the interior of the sealed tank 210 is in the mesophilic anaerobic state, for example, at or about 36 degrees Celsius. In addition, the inner wall of the sealed tank 210 may include a guide vane 230 that may be used to regulate the flow direction of the sewage water in the sealed tank 210. At the top of the sealed tank 210, a gas guiding groove 240 and a gas collecting device 250 may be arranged such that the gas guiding groove 240 guides the gas in the sealed tank 210 into the gas collecting device 250.

As shown in FIG. 4, the heating device 220 may include a hot water circulating coil pipe 221 arranged in the sealed tank 210 and a circulating pump 222 arranged outside the sealed tank 210. For example, the circulating pump 222 may be a hot water circulating pump. A thermal medium inlet 223 and a thermal medium outlet 224 may be arranged on the hot water circulating coil pipe 221, and the circulating pump 222 may drive a thermal medium into the hot water circulating coil pipe 221 through the thermal medium inlet 223 and out of the hot water circulating coil pipe 221 through the thermal medium outlet 224. As the thermal medium flows through the hot water circulating coil pipe 221 the sewage water in the sealed tank 210 may be heated to form a mesophilic anaerobic environment in the sealed tank 210.

Further, in order to maximize the level of anaerobic mixture of the sewage water in the sealed tank 210, a guide vane 230 may be arranged on the inner wall of the sealed tank 210. The guide vane 230 may include a plurality of sub-vanes, as further shown in FIG. 4. Each sub-vane may be a projection off the inner wall of the sealed tank 210. The projection may be a rectangular prism having a height, width, and a length. For example, the projection may be 0.5 cm×20 cm×40 cm. The projection may be arranged on the inner wall such that the width of the projection (20 cm in the given example) extends into the sealed tank 210 and the length of the projection (40 cm in the given example) may extend diagonally along the inner wall of the sealed tank 210, for example at an angle of 30 degrees or more or less from horizontal. In cases where the sealed tank 210 has a plurality of walls, each wall may have four sub-vanes, and each of the four sub-vanes may have a first end at an edge of a given wall and a second end positioned closer to a center of the given wall and higher than the first end. In some examples, the guide vane 230 may be formed integral with the wall of the sealed tank, such as using a mold. In other examples, the guide vane 230 may be attached to the wall of the sealed tank using an adhesive or other attachment means, in which case the guide vane 230 may be a different material than the sealed tank.

The guide vane 230 may cause the sewage water to stir when heated. For instance, when heated by the heating device, the heated sewage water at the bottom of the sealed tank may rise within the sealed tank. As the heated sewage water rises, it may come into contact with the guide vane 230, which projects from one or more walls of the sealed tank 210. The portion of the heated sewage water that is in contact with the guide vane 230 may rise along the diagonal of the guide vane 230, and not directly upwards, which may cause a stirring effect within the sewage water. In this way, the level of anaerobic mixture of the sewage in the sealed tank may be increased.

Figure 5:
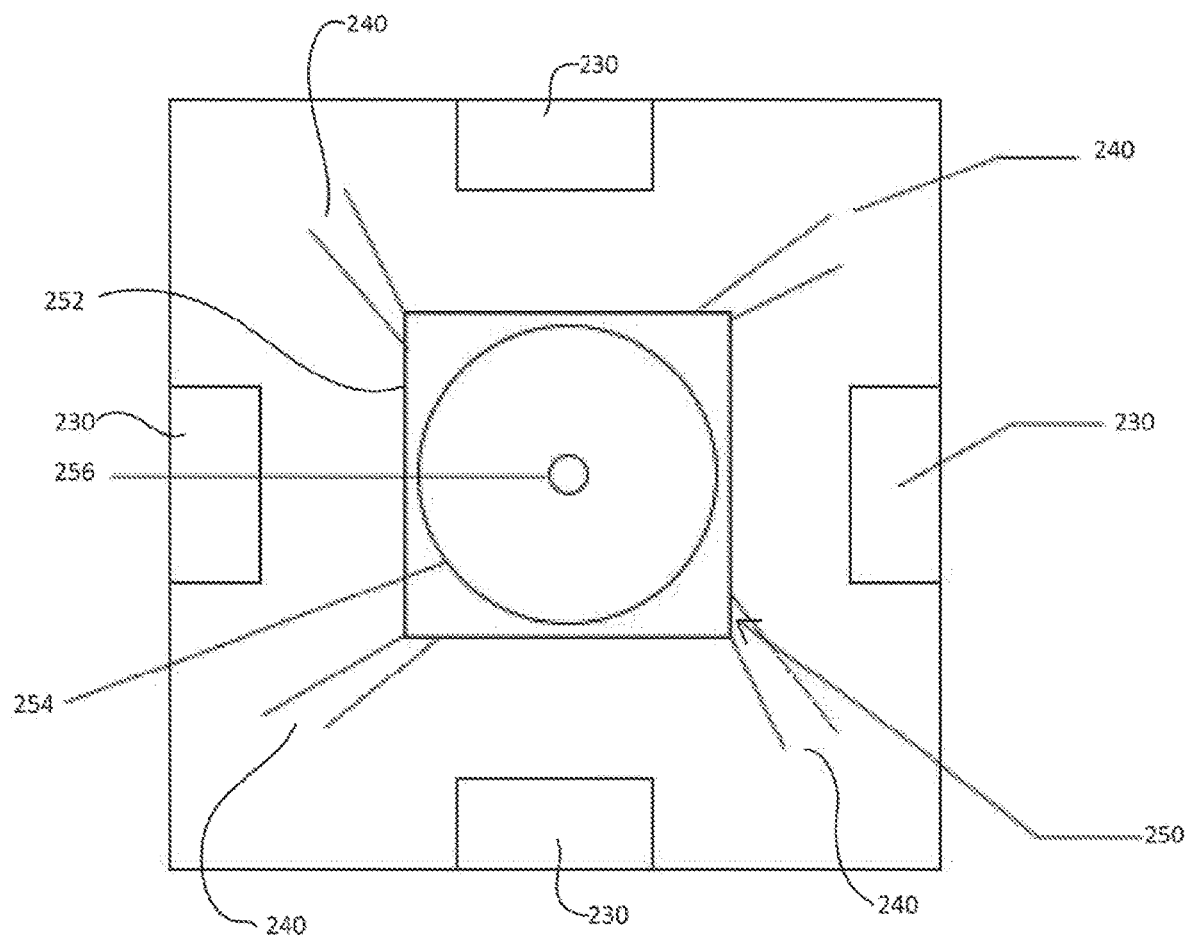
FIG. 5 is another structural diagram 500 of an IoT-based self-elevating stirring guide anaerobic fermentation device according to the present invention

As shown in FIG. 5, at a top of the sealed tank 210, there may be the gas guiding groove 240. The gas guide groove 240 may include a plurality of radially distributed channels. Each channel may include a pair of ribs that are positioned at a distance to one another, where the pair of ribs is closer together at a first end and farther apart at a second end. Each channel may therefore be narrower at the first end and wider at the second end. In some implementations, the width may be at or about 5 cm on average and the length (distance from the first end to the second end) may be at or about 15 cm. In addition, each channel may be positioned about a center of the top of the sealed tank 210 with the first end positioned closer to the center than the second end. In some implementations, the second end of the channel may be positioned closer to a given corner of the sealed tank than the first end of the channel. Moreover, the channels may be arranged at an angle to a radial projection from the center of top of the sealed tank 210, such as an angle of 32.5 degrees counterclockwise or clockwise (counterclockwise in the northern hemisphere and clockwise in the southern hemisphere). The first ends of the channels may not intersect the center of the sealed tank 210, and the channels may not be connected with each other. The ribs of the channels may extend from the inner top wall of the sealed tank 210 downward towards the interior of the sealed tank 210, such as by 2 or 3 cm, or more or less. In addition, the ribs may be formed integrally with the sealed tank or may be formed separately of the same or different material and adhered or attached to the inner top wall of the sealed tank with any known means. The ribs may be straight and/or curved, but are not limited thereto.

At the center of the top of the sealed tank 210 may be the gas collecting device 250. The gas collecting device 250 may have a square top structure 252 and a rounded hood 254. In other implementations, the structure and the hood may be shaped differently but still perform the function described herein. The square top structure 252 may include a plurality of walls positioned in a square to atop the sealed tank 210 around an opening to the sealed tank 210. The square top structure 252 may have a width and a length that are the same, such as 40 cm, or more or less. The opening to the sealed tank 210 may have a smaller area than the width and length of the square top structure 252. The plurality of walls of the square top structure 252 may extend perpendicularly from the top of the sealed tank 210 at a height that is the same as its width and length, such as 40 cm, or more or less. In addition, the square top structure 252 may be formed integrally with the sealed tank 210.

The rounded hood 254 may be fitted inside the square top structure 252, completely covering the opening to the sealed tank 210. The rounded hood 254 may be a hemispherical cap having a diameter that is the same as the width of the square top structure 252 or less. When fitted in the square top structure 252, the circular base of the rounded hood 254 may be placed more proximal to the sealed tank 210 than the top of the rounded hood 254. The top of the rounded hood 254 may be at approximately the same height as the square top structure 252. In some cases, the rounded hood 254 may include a bezel extending from the perimeter of the circular base configured to contact the top of the sealed tank 210 and/or the square top structure 252. A seal may be made between the rounded hood 254 and the sealed tank 210 and/or the square top structure 252. For example, water may be included in the square top structure 252 when the rounded hood 254 is fitted within the square top structure 252 such that the water sits between the plurality of walls of the square top structure 252 and the surface of the rounded hood 254 in order to provide a seal between the square top structure 252 and the rounded hood 254.

In addition, the gas collecting device 250 may have one or more outlets that may allow gas to leave the gas collecting device 250, such as a pipe 256 or a vent. The one or more outlets may include a water sealing structure, such as a trap, so as to provide a seal at the one or more outlets. In some implementations, the one or more outlets of the gas collecting device 250 may lead to another pipe that funnels the gas into another area or portion of the sewage treatment system. Therefore, as gas rises in the sealed tank, the gas guide groove 240 may guide the gas towards the gas collecting device 250 on the top of the sealed tank 210. Thus, gas congestion within the sealed tank may be reduced.

In addition, the anaerobic fermentation tank may also include a water quality sensor module that supports a scalable wireless data transmission network, such as one described above with respect to the bioactive filler component. The water quality sensor module may be fixed on the inner wall of the sealed tank with an adhesive or other attachment means. The water quality sensor module may be any one or more types of a microbial sensor (for example, an electrode capacitance sensor), a methane concentration sensor, a COD sensor, a TN sensor, an NH3 sensor, a TP sensor, a pH sensor, an SS sensor, a chroma sensor, a turbidity sensor, a temperature sensor, and/or a pressure sensor, but is not limited thereto. The water quality sensor may be used to detect and monitor variables within the anaerobic fermentation tank, such as bioactivity or temperature. The detected variables may be used to determine a change to the system, and a signal may be transmitted according to the determined change to cause the change. For example, when the water quality sensor detects a drop in temperature below a low threshold, a signal to the heating device 220 may be transmitted to cause the heating device 220 to increase the heat in the sealed tank.

The anaerobic fermentation tank may also include a water inlet to receive sewage water and a water outlet to dispense sewage water. Via the water inlet and the water outlet, the anaerobic fermentation tank may be connected in a sewage treatment system in series with other anaerobic tanks and/or aerobic biochemical pools, such as in the system described further below. Under the premise that the sewage is sieved at the front end, an amount of organic suspended matters in the anaerobic fermentation tank from the sewage treatment process may be reduced. As the amount of sediment produced in anaerobic fermentation tank may be relatively small, sediment may be cleared once every 10 years to 20 years, thereby reducing the sludge disposal cost of the whole device.

The tank having the features disclosed above has the following beneficial effects:

(1) Having a heating device arranged at the bottom of the sealed tank to heat the sewage water allows a mesophilic anaerobic environment to be efficiently formed in the sealed tank. In this way, the efficiency of anaerobic fermentation may be improved.

(2) The use of a guide vane 230 is arranged on the inner wall of the sealed tank allows the sewage water to be stirred as it is heated without the need for additional power for stirring the sewage water. Thus, the energy consumption for stirring may be reduced.

(3) Use of a gas guiding groove 240 and a gas collecting device 250 as disclosed may efficiently collect and guide any gas within the sealed tank, thereby reducing congestion and improving the effective processing volume and gas yield of the sealed tank.

(4) Including a water sensor module on an interior wall of the sealed tank may allow for real-time monitoring of bioactivity and other variables within the sealed tank and may provide accurate working parameters for the heating control and supplement of nutritional supplements in the system. The level of operation control may therefore be improved.

Example Sewage Treatment System

The sewage treatment system may also include an IoT-based aerobic sewage treatment system that has a structure configured to allow formation of multi-stage biochemical reactions to decompose and degrade the organic pollutants in sewage. The aerobic sewage treatment system may thereby cause deep removal of pollutants. In addition, the aerobic treatment system may include level drops that may allow for an adequate concentration of dissolved oxygen in the sewage water in back-end aerobic biochemical pools.

Figure 6:
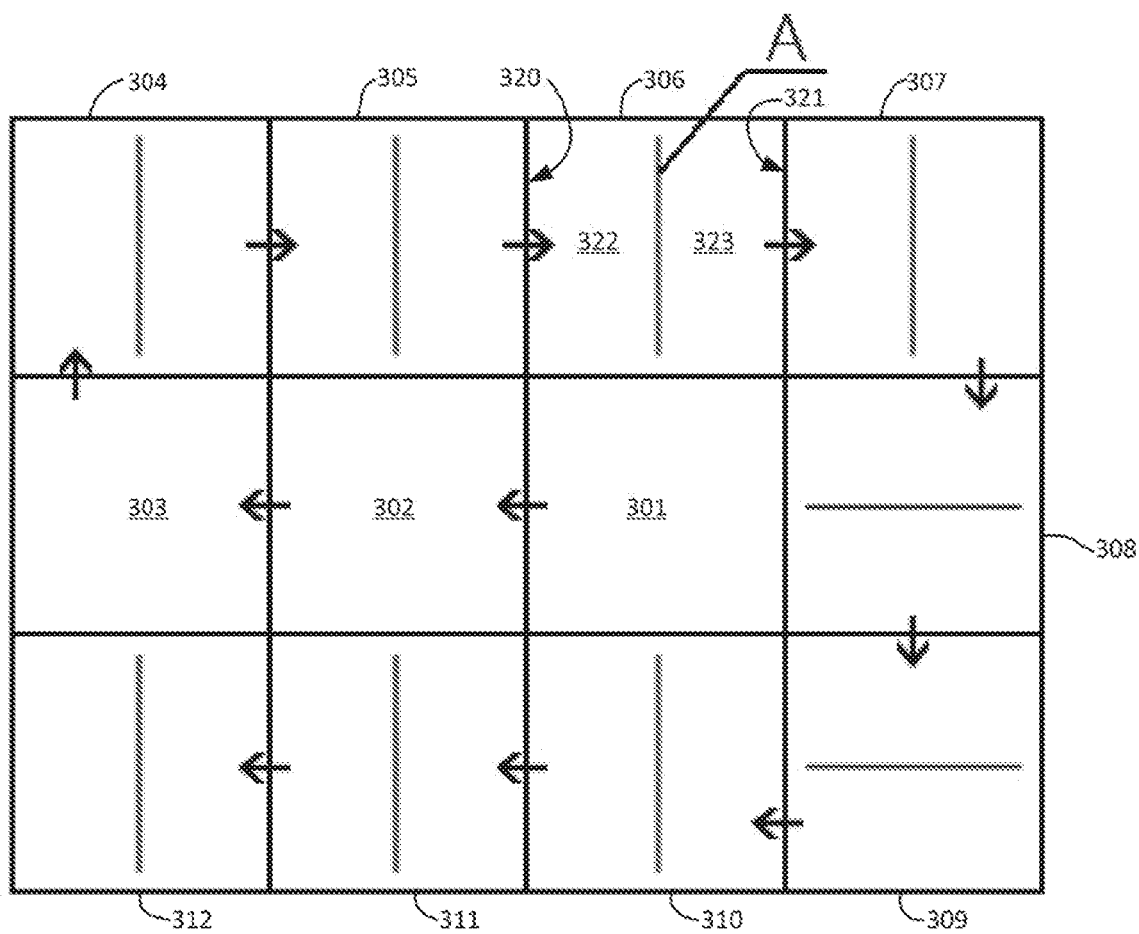
FIG. 6 is a top view 600 of an IoT-based aerobic front-end local aeration sewage treatment device according to the present invention.
Figure 7:
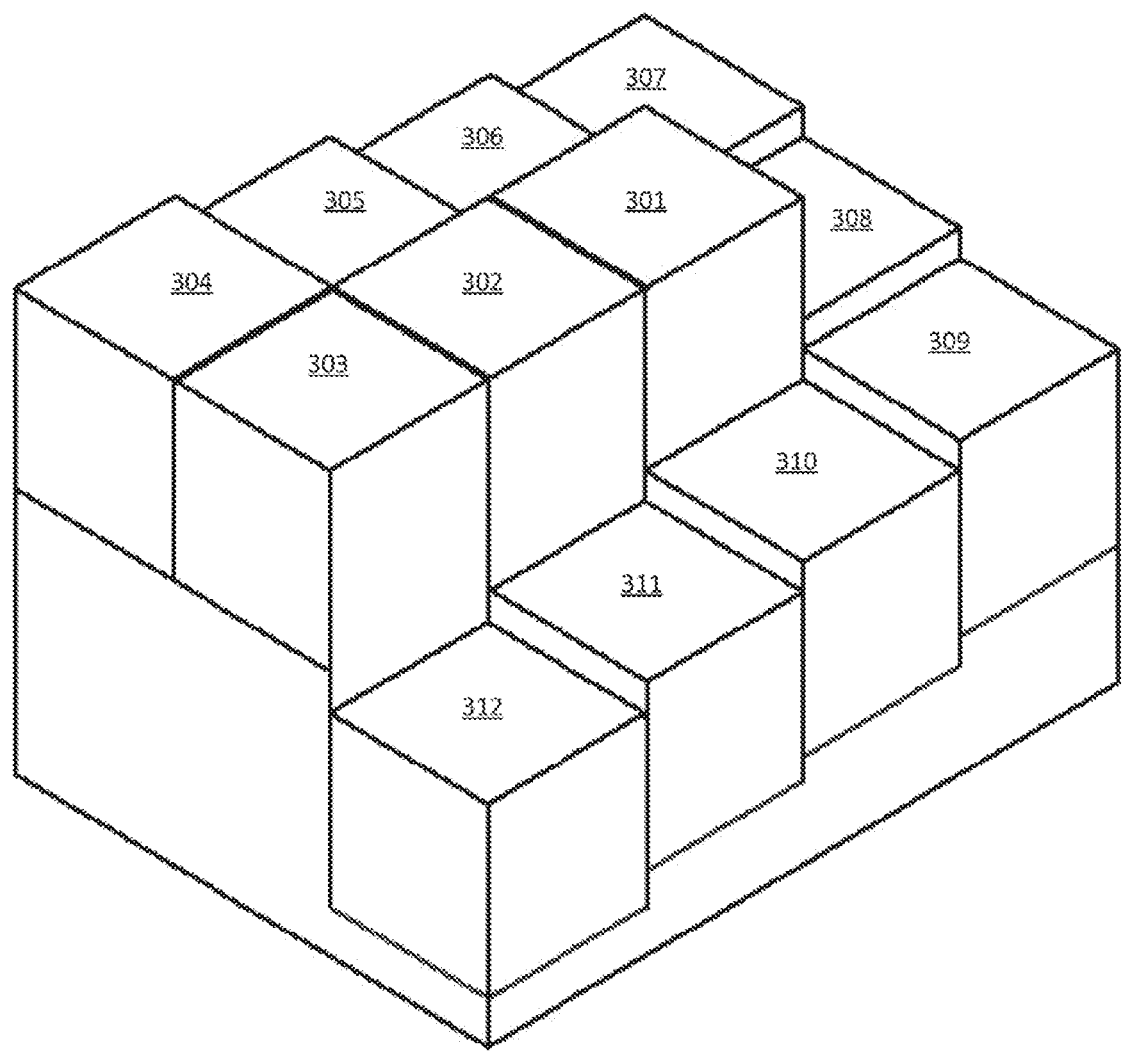
FIG. 7 is a three-dimensional view 700 of an IoT-based aerobic front-end local aeration sewage treatment device according to the present invention.

As shown in FIGS. 6 and 7, the IoT-based aerobic sewage treatment system may include a multi-stage anaerobic tank group and a multi-stage aerobic biochemical pool group connected in series. After being sieved, sewage water may enters the first anaerobic tank, flows through the anaerobic tank group connected in series and the aerobic biochemical pool group connected in series, and finally flows out of the last aerobic biochemical pool. Thus, the sewage treatment process may be performed.

The multi-stage anaerobic tank group may include a plurality of anaerobic tanks, such as anaerobic tanks 301, 302, and 303 connected in series. These anaerobic tanks may have the same or similar features as the sealed tank 210 described above. Anaerobic tank 301 may be a start point of the group. Sewage water may be received at anaerobic tank 301 and processed. Then the sewage water may be transferred from anaerobic tank 301 to anaerobic tank 302. After being processed in anaerobic tank 302, the sewage water may be transferred to anaerobic tank 303.

The multi-stage aerobic biochemical pool group may include a plurality of aerobic biochemical pools, such as aerobic biochemical pools 304, 305, 306, 307, 308, 309, 310, 311, and 312 connected in series. These aerobic biochemical pools may be rectangle-shaped pools having a width, length, and height that are same or similar. For example, the width may be 1 meter, the length may be 1 meter, and the height may be 3 meters. The dimensions may vary depending on the scale of the treatment project. Aerobic biochemical pool 304 may be configured to receive sewage water from anaerobic tank 303 and further process the sewage water. Then the sewage water may be transferred from aerobic biochemical pool 304 to aerobic biochemical pool 305 and processed in aerobic biochemical pool 305. This process continues through each of the aerobic biochemical pools 306-312. The anaerobic tanks and aerobic biochemical pools may be filled with bioactive filler components, as described above. At every transition from one tank or pool to a next tank or pool, the sewage water is transferred through circulating holes, such as pipes. The pipes may be located at or about 10 centimeters below the top of the pools. Preferably, the circulating hole may be composed of a polyethylene pipe (PE pipe). Each ends of the PE pipe may be connected with an anaerobic tank or aerobic biochemical pool and a neighboring anaerobic tank or aerobic biochemical pool. In the multi-stage aerobic biochemical pool group, a gas supply device may be arranged on the first aerobic biochemical pool of the group. In the example shown in FIGS. 6 and 7, the gas supply device is arranged on aerobic biochemical pool 4. The aerobic biochemical pools in the multi-stage aerobic biochemical pool group may be arranged in a stepped formation with decreasing height at each transition.

The gas supply device arranged on the aerobic biochemical pool 304 may be configured to add oxygen to the sewage water to improve the concentration of dissolved oxygen in the sewage. None of the other aerobic biochemical pools 305, 306, 307, 308, 309, 310, 311, or 312 needs to be provided with a gas supply device. In addition, by arranging the aerobic biochemical pools 304-312 in the multi-stage aerobic biochemical pool group in a stepped formation with decreasing height, a flow of the sewage water from a previous higher aerobic biochemical pool down into a next lower aerobic biochemical pool in the group naturally adds oxygen to the sewage water due to the drop. In this way, the concentration of dissolved oxygen in the sewage water may be maintained in the next aerobic biochemical pool.

As shown in more detail in FIG. 7, in the multi-stage aerobic biochemical pool group, the heights of the tops of the aerobic biochemical pools 304-312 decrease in turn, while the depths of each of the aerobic biochemical pools 304-312 may be the same. Accordingly, the horizontal heights of the bottoms of the aerobic biochemical pools 304-312 also decrease in turn. Meanwhile, the thicknesses of the bottoms of the aerobic biochemical pools 304-312 may decrease in turn to compensate for the change in height above the ground level. Thus, a water flow may flow into the next aerobic biochemical pool in part under the effect of the stepped drop potential. For example, the water flow may be carried through the pipes to the next aerobic biochemical pool.

Returning to FIG. 6, each of the aerobic biochemical pools 304-312 may be internally provided with a partition A. The partition A may divide each of the aerobic biochemical pools 304-312 into a first pool body and a second pool body that are connected with each other. The partition A is preferably made of a PVC material. For example, for aerobic biochemical pool 306, the partition A may be suspended using adhesion or other attachment means to one or more edges of the aerobic biochemical pool 306. For example, when the material of the pool and the partition A is metal, the attachment means may be welding. The partition A may be suspended substantially parallel to a first wall 320 and a second wall 321 of the aerobic biochemical pool 306, and may be suspended substantially in a center of the aerobic biochemical pool 306. As shown, the partition A may divide the aerobic biochemical pool 306 into a first pool body 322 and a second pool body 323. The partition A may not extend through the entire width of aerobic biochemical pool 306, therefore the first pool body 322 and the second pool body 323 may be connected around the ends of the partition A. In addition or in the alternative, the partition A may not extend through the entire height of the biochemical pool 306, therefore the first pool body 322 and the second pool body 323 may be connected above or below the partition A. This configuration of the partition A may guide water flow from the first pool body 322 to the second pool body 323.

During operation, each of the aerobic biochemical pools 304-312, the first pool body may receive the sewage water that flows from the previous anaerobic tank or aerobic biochemical pool, the second pool body may be configured to discharge the sewage to the next aerobic biochemical pool. The partition A may slow a flow of the sewage water through the aerobic biochemical pool to allow the sewage water to pass through all the bioactive materials, such as the bioactive filler component, in the aerobic biochemical pools 304-312. In this way, the efficiency of sewage treatment may be improved.

An aerobic sewage treatment system may also include a sensor module that supports a scalable wireless data transmission network, such as one described above with respect to the bioactive filler component or the anaerobic fermentation tank. The sensor module may be fixed with an adhesive on the inner walls of anaerobic tanks and/or aerobic biochemical pools. Preferably, the sensor module can be any one or more types of a microbial sensor (for example, an electrode capacitance sensor), a dissolved oxygen sensor, a methane concentration sensor, a COD sensor, a TN sensor, an NH3 sensor, a TP sensor, a pH sensor, an SS sensor, a chroma sensor, a turbidity sensor, a temperature sensor, or a pressure sensor, but is not limited thereto.

In addition to the uses described above, the water quality sensor may also be used to detect and monitor variables within an aerobic biochemical pool, such as bioactivity, oxygen levels, or water volume. In one example, when oxygen levels are detected by the water quality sensor to be lower than a low threshold, a signal may be transmitted to the gas supply device to increase an amount of oxygen being added to the sewage water. In another example, when the water quality sensor detects an increase in water volume in the aerobic biochemical pool above a high threshold, a signal may be transmitted to either cause the water flow to the aerobic biochemical pool to slow or to cause an alert that provides notification of the high volume in the aerobic biochemical pool.

The water treatment system described above has the following beneficial effects:

(1) By connecting anaerobic tanks in series, organic suspended matters in sewage may be reduced, and maintenance costs may also be reduced.

(2) By connecting aerobic biochemical pools in series, multi-stage biochemical reactions may be formed to decompose, degrade, and remove organic pollutants in sewage, thereby achieving a high organic pollutant removal efficiency with little excess sludge and reducing the costs of sludge disposal.

(3) Arranging aerobic biochemical pools in a stepped shape reduces the need for gas supply devices, which reduces power consumption.

(4) A sensor module may allow bioactivity to be monitored in real time, and may allow for timely adjustment of the air supply quantity, the water flow, or the dosage of biological nutrient agents to improve the sewage treatment efficiency.

(5) The water treatment system may further be connected with the IoT to provide the operation stability and economic benefits.

(6) The water treatment system may utilize bioactive filler components, such as those described above, which may be designed to allow for high-performance strains of microbial populations with varying functions to adhere to the bioactive fillers. For example, the microbial populations may function to decompose pollutants in the sewage water and may include strains of yeast bacteria, digestive bacteria, and/or anti-digestive bacteria. Therefore, bioactive filler components may be imbued with a different function and may be placed in different anaerobic tanks and aerobic biochemical pools based on the function. A given anaerobic tank or aerobic biochemical pool may therefore be configured to provide a particular function in the water treatment process. In this way, the degradation of organic matters in the sewage by microbial populations may be more targeted, orderly, and efficient.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A bioactive filler component configured to communicate with an Internet of Things (IoT) system, comprising:
   a main board that comprises a first curved surface and a second curved surface arranged opposite to each other, wherein outer contours of the first curved surface and the second curved surface are circular, and ends of the first curved surface and those of the second curved surface are interconnected to form a cylinder;
   a first piece that is fixed to the first curved surface and the second curved surface of the main board;
   a second piece that is fixed to the first curved surface and the second curved surface of the main board and perpendicular to the first piece;
   an accessory piece that is fixed to the first curved surface and the second curved surface of the main board, perpendicular to the first piece, and parallel to the second piece;
   a plurality of first through holes that is arranged on the main board;
   a plurality of second through holes that is arranged on the first piece or the second piece; and
   a sensor module fixed on one of the plurality of through holes and configured to wirelessly transmit data.

2. The bioactive filler component as described in claim 1, wherein:

the first curved surface and the second curved surface are symmetrically arranged about a plane of symmetry that is perpendicular to the first piece, the second piece, and the accessory piece.

3. The bioactive filler component as described in claim 1, wherein the first piece and the second piece both are a structure piece having four sides and four corners piece that are arc chamfers.

4. The bioactive filler component as described in claim 1, wherein the main board, the first piece, the second piece, and the accessory piece include bioactive materials having affinity to microorganisms.

5. The bioactive filler component as described in claim 1, wherein the sensor module comprises a signal conditioning circuit, a microcontroller, a radio transceiver, and an internal power supply.

6. The bioactive filler component as described in claim 5, wherein the sensor module comprises one or more types of a microbial sensor.

7. The bioactive filler component as described in claim 5, further comprising an external power supply arranged outside a sealed tank and connected to the sensor module in a wired or wireless mode.

8. The bioactive filler component as described in claim 5, wherein the sensor module is configured to be connected to the IoT system.

\* \* \* \* \*